(12) United States Patent
Bariviera et al.

(10) Patent No.: US 11,454,536 B2
(45) Date of Patent: Sep. 27, 2022

(54) COOKTOPS WITH INTEGRATED EXTRACTION HOODS AND SCALES

(71) Applicant: Elica S.p.A., Fabriano (IT)

(72) Inventors: Diego Bariviera, Fabriano (IT); Marco Cimino, Fabriano (IT); Manuele Martelli, Fabriano (IT); Luca Meniconi, Sigillo (IT)

(73) Assignee: ELICA S.p.A., Fabriano (IT)

( * ) Notice: Subject to any disclaimer, the term of this patent is extended or adjusted under 35 U.S.C. 154(b) by 254 days.

(21) Appl. No.: 16/960,857

(22) PCT Filed: Jan. 7, 2019

(86) PCT No.: PCT/IB2019/050104
§ 371 (c)(1),
(2) Date: Jul. 8, 2020

(87) PCT Pub. No.: WO2019/138312
PCT Pub. Date: Jul. 18, 2019

(65) Prior Publication Data
US 2021/0063234 A1    Mar. 4, 2021

(30) Foreign Application Priority Data
Jan. 12, 2018  (IT) .......................... 102018000000794

(51) Int. Cl.
*G01G 19/56* (2006.01)
*F24C 15/10* (2006.01)
(Continued)

(52) U.S. Cl.
CPC ............ *G01G 19/56* (2013.01); *F24C 15/10* (2013.01); *F24C 15/2042* (2013.01); *H05B 1/0266* (2013.01)

(58) Field of Classification Search
CPC ...... G01G 19/56; F24C 15/10; F24C 15/2021; F24C 15/2035; F24C 15/2042; H05B 1/0266
See application file for complete search history.

(56) References Cited

U.S. PATENT DOCUMENTS 5,958,272 A * 9/1999 Taplan .................... F24C 7/083
219/465.1
10,900,665 B2 * 1/2021 Flesch ................. F24C 15/2035
(Continued)

FOREIGN PATENT DOCUMENTS

CN   214619706 U * 11/2021  ................ F24C 3/12
DE   WO95/35483    * 12/1995  ............. G01G 19/56
(Continued)

OTHER PUBLICATIONS

International Search Report and Written Opinion in corresponding International Application No. PCT/IB2019/050104 dated Apr. 11, 2019, 12 pages.

*Primary Examiner* — Jorge A Pereiro
*Assistant Examiner* — Nikhil P Mashruwala
(74) *Attorney, Agent, or Firm* — MH2 Technology Law Group LLP

(57) ABSTRACT

A cooktop may include: a main body having a top surface, a bottom surface, and a suction opening; at least one cooking area configured to accommodate a heating element proximate to the top surface; suction means in fluid communication with the suction opening and configured to draw in cooking fumes; a support element connected to the main body; and weight sensing means between the support element and the main body for sensing a weight of objects to be weighed. The support element may at least partially overlap the suction means. The suction means may include: a suction duct in fluid communication with the suction opening; and a housing in fluid communication with the (Continued)

suction duct and configured to receive filters for the cooking fumes. The weight sensing means may be at the suction duct and/or the housing. The suction opening may be on the top surface.

20 Claims, 5 Drawing Sheets

(51) Int. Cl.
*F24C 15/20* (2006.01)
*H05B 1/02* (2006.01)

(56) References Cited

U.S. PATENT DOCUMENTS

| | | | |
|---|---|---|---|
| 11,098,906 B2 * | 8/2021 | Heppi | F24C 15/2035 |
| 2011/0253693 A1 | 10/2011 | Lyons et al. | |

FOREIGN PATENT DOCUMENTS

| | | | | |
|---|---|---|---|---|
| DE | 102009054792 A1 | | 6/2011 | |
| DE | 102013206748 A1 | | 10/2013 | |
| DE | 192015116847 B4 * | | 4/2017 | F24C 7/08 |
| IT | RM2006U000192 | | 5/2008 | |
| IT | WO2017103708 A1 * | | 6/2017 | F24C 15/20 |
| JP | 2010112599 A | | 5/2010 | |
| JP | 2012000229 A | | 1/2012 | |
| JP | 2012084546 A | | 4/2012 | |
| WO | 2017175085 A1 | | 10/2017 | |

* cited by examiner

COOKTOPS WITH INTEGRATED EXTRACTION HOODS AND SCALES

CROSS-REFERENCE TO RELATED APPLICATION(S)

This application is a national stage entry from International Application No. PCT/IB2019/050104, filed on Jan. 7, 2019, in the Receiving Office ("RO/IB") of the International Bureau of the World Intellectual Property Organization ("WIPO"), and published as International Publication No. WO 2019/138312 A1 on Jul. 18, 2019; International Application No. PCT/IB2019/050104 claims priority from Italian Patent Application No. 102018000000794, filed on Jan. 12, 2018, in the Italian Patent and Trademark Office ("IPTO"), the entire contents of all of which are incorporated herein by reference.

FIELD OF THE INVENTION

The present invention relates to a cooktop in accordance with the preamble of claim 1.

Particularly, but without limitation, the present invention relates to a cooktop integrating a hood that is commercially available under the name of "downdraft hood".

BACKGROUND OF THE INVENTION

Domestic hoods have become a common feature in residential kitchens, due to their undisputed usefulness in extracting food preparation gases, i.e. vapors generated during by cooking. The provision of domestic hoods that can effectively remove cooking vapors generated during food preparation is of increasing importance.

For this purpose, hoods have been developed that can both extract air and exhaust the extracted air out of the house, using an intake section, and filter such air and recirculate it into the domestic environment.

Downdraft hoods are among the variety of commercially available hoods, and are often integrated either in a cooktop or in a kitchen furniture countertop. Namely, the downdraft hood is configured to generate a descending current that is higher than the ascending flow rate of cooking steam, so that such steam is extracted toward the cooktop in a vertical downward direction.

Cooktops comprising scales are also known in the art, as disclosed for instance in the Italian utility model 264 479.

Namely, this cooktop integrates electronic or mechanical sensors located proximate to the burners. In addition, the cooktop comprises a plurality of support grates, particularly a grate for each burner. These grates are designed to rest upon the sensors, such that as a pot is placed upon a grate, its weight may be immediately read.

While the above described example is specially designed for a gas cooktop, similar arrangements have been also developed for electric cooktops, which may be either resistive or induction cooktops.

A cooktop according to the preamble of claim 1 is described in document DE 10 2009 054792 A1.

PRIOR ART PROBLEM

The integration of a scale into a cooktop involves the drawback of requiring arrangements to prevent infiltration of any liquids and/or vapors proximate to the cooktop, which may damage the electric parts of the cooktop. The prior art arrangement requires the use of insulating seals, but these parts are prone to wear, and must be hence replaced once or multiple times during the life of the cooktop to ensure their integrity.

SUMMARY OF THE INVENTION

Therefore, the technical purpose of the present invention is to provide a cooktop that can overcome the aforementioned prior art drawbacks.

Particularly, the object of the present invention is to provide a cooktop that incorporates a scale and can ensure a seal against any cooking liquids that might be poured thereupon.

The aforementioned technical purpose and objects are substantially fulfilled by a cooktop that comprises the technical features as disclosed in one or more of the accompanying claims.

Particularly, a cooktop in accordance with the present invention comprises a main body that has a top surface and a bottom surface. At least one cooking area is configured to accommodate a heating element proximate to the top surface.

A suction opening is formed on the top surface. Suction means are in fluid communication with the suction opening to draw in cooking fumes.

A support element is connected to the main body. Weight sensing means are placed between the support element and the main body, to sense the weight of any objects placed thereupon. The support element at least partially overlaps the suction means.

This device solves the technical problem, as it allows the same area of the cooktop to be used both to draw in cooking fumes and to weight objects. Both the suction opening and the filter housing are already fluid-tightly sealed. No additional seal is hence required.

LIST OF DRAWINGS

Further features and advantages of the present invention will result more clearly from the illustrative, non-limiting description of a preferred, non-exclusive embodiment of a cooktop as shown in the annexed drawings, in which.

DETAILED DESCRIPTION

Figure 1:
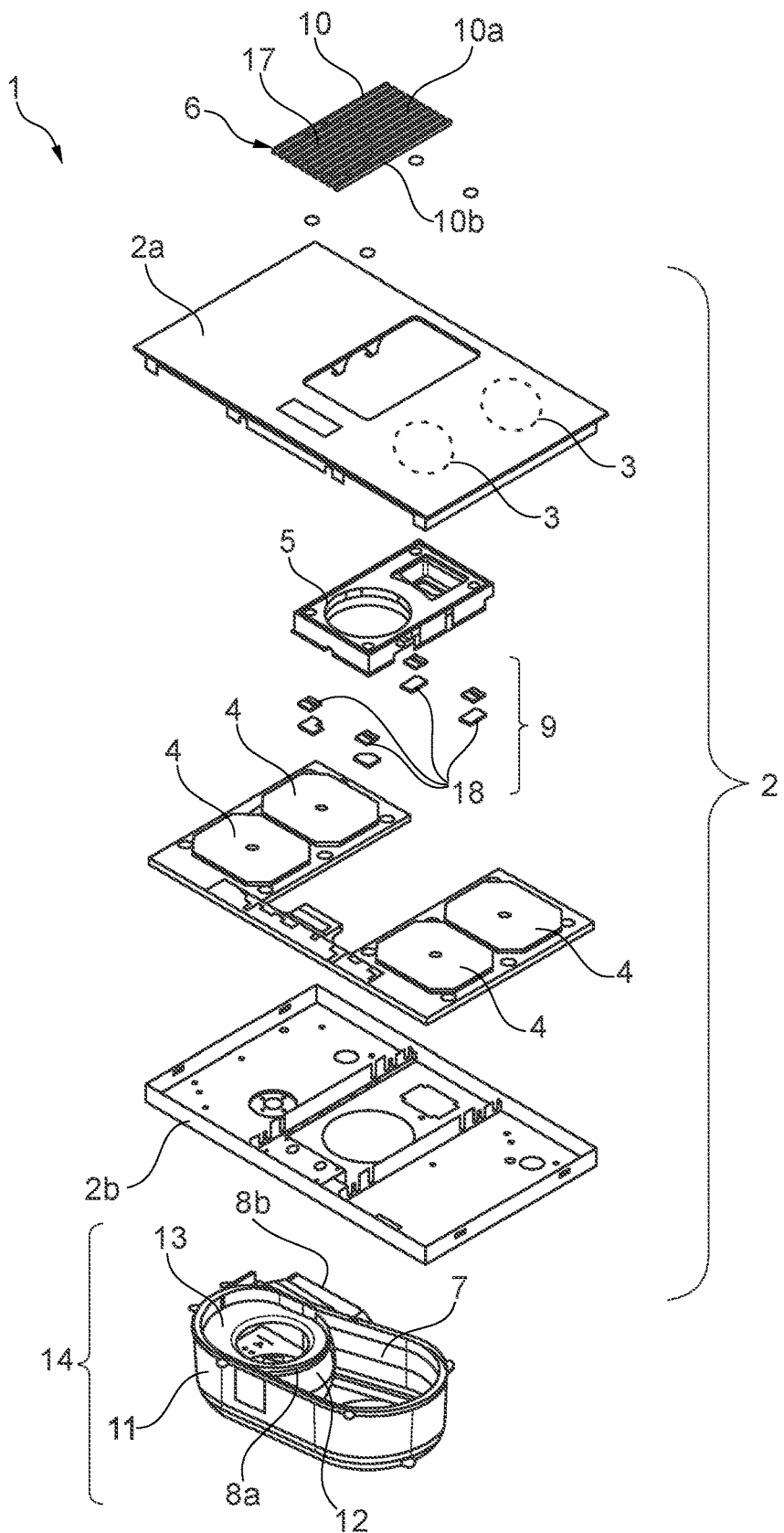
FIG. 1 is an exploded perspective view of a first embodiment of a cooktop of the present invention.

Even when this is not expressly stated, the individual features as described with reference to the particular embodiments shall be intended as auxiliary to and/or interchangeable with other features described with reference to other exemplary embodiments.

Referring to the annexed figures, numeral 1 designates a cooktop of the present invention.

The cooktop 1 comprises a main body 2.

The main body 2 has a top surface 2a and a bottom surface 2b. Namely, when the cooktop 1 is installed, the top surface 2a of the main body 2 is designed to be the exposed or visible side for the user while the bottom surface 2b is designed to be the side that is hidden to the view of user, e.g. because embedded in kitchen furniture. In one embodiment, the top surface 2a is embodied as a glass sheet or a sheet made of any material having similar properties (not shown).

According to a preferred aspect, both the top surface 2a and the bottom surface 2b are embodied as parallel and opposed flat surfaces. Therefore, the main body 2 defines a volume that is adapted to contain the parts required for controlling and heating/cooking food, as well as for downward extraction of cooking vapors.

More in detail, the main body 2 has at least one cooking area 3 which is configured to accommodate a heating element 4 at the top surface 2a.

Particularly referring to FIG. 1, a plurality of cooking areas 3 may be defined on the top surface 2a. In this case, the cooking areas 3 are suitably distributed over the top surface 2a of the main body 2 and are particularly designed to radiate heat, if the heating elements are of resistive type, or to induce heat generation in appropriate cooking containers, if the heating elements are of inductive type.

In the illustrated embodiments, there are four cooking areas 3, although different alternative embodiments, not shown, may be provided, in which the number of cooking areas 3 is greater or smaller.

The main body 2 also has a suction opening 5, particularly on the top surface 2a, and has the purpose to draw in cooking fumes.

The cooktop 1 also comprises suction means 14 associated with the top surface 2a. These suction means 14 have the purpose to draw in the cooking fumes proximate to the top surface 2a of the main body 2. Namely, the suction means 14 comprise a duct 7 in fluid communication with the opening 5.

The suction means 14 further comprise a housing 15 in fluid communication with said duct and is configured to receive filters 25 for the cooking fumes.

The suction means 14 further comprise a centrifugal fan (not shown) connected to an inlet port 8a and an outlet scroll 8b. The inlet port 8a is in fluid communication with the duct 7.

More in detail, the suction means 14 comprise a motor (not shown) with the centrifugal fan to set it into rotation. Particularly, the motor is mechanically coupled to the centrifugal fan, e.g. by a direct mechanical coupling between the rotor of the motor and the hub of the centrifugal fan.

As shown for example in FIG. 1, the suction means 14 comprises a peripheral wall 11 that extends transverse and particularly perpendicular to the bottom surface 2b of the main body 2. The peripheral wall 11 at least partially defines the duct 7 and the outlet scroll 8b.

The suction means 14 further comprises a partition wall 12, also transverse and particularly perpendicular to the bottom surface 2b of the main body 2. The partition wall 12 is arranged within the peripheral wall 11, and separates the duct 7 from the outlet scroll 8b of the centrifugal fan 8 (not shown).

A septum 13 is transverse to the walls 11, 12 and at least partially defines the outlet scroll 8b of the centrifugal fan (not shown). The aforementioned inlet port 8a is formed on the septum 13 and is designed to channel the air flow into the centrifugal fan (not shown).

Particularly referring to FIG. 1, the cooktop 1 comprises a support element 6 connected to the main body 2. This support element 6 has the purpose of supporting of items to be weighed, e.g. food containers. It shall be noted that, according to the invention, the support element 6 at least partially overlaps the suction means 14.

More in detail, the support element 6 comprises a panel 10.

Figure 2:
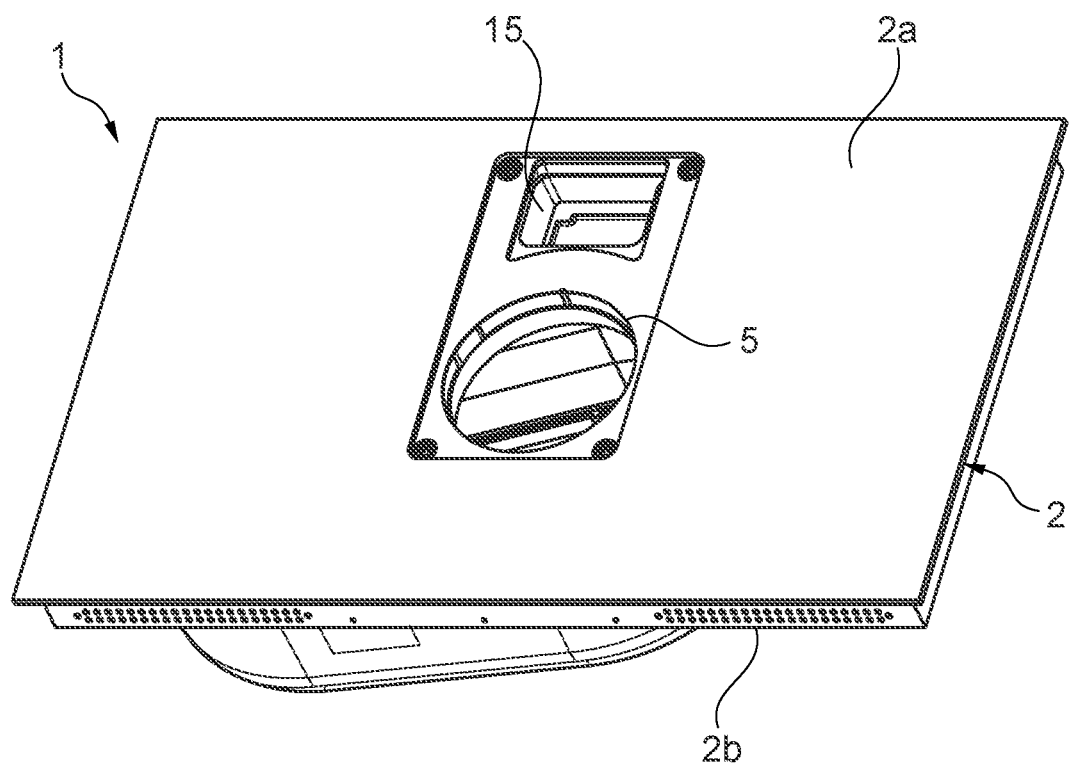
FIG. 2 is a perspective view of the cooktop of FIG. 1.

According to a first embodiment of the invention, as shown in FIGS. 1 and 2, the panel 10 entirely covers both the opening 5 and the housing 15.

Figure 4:
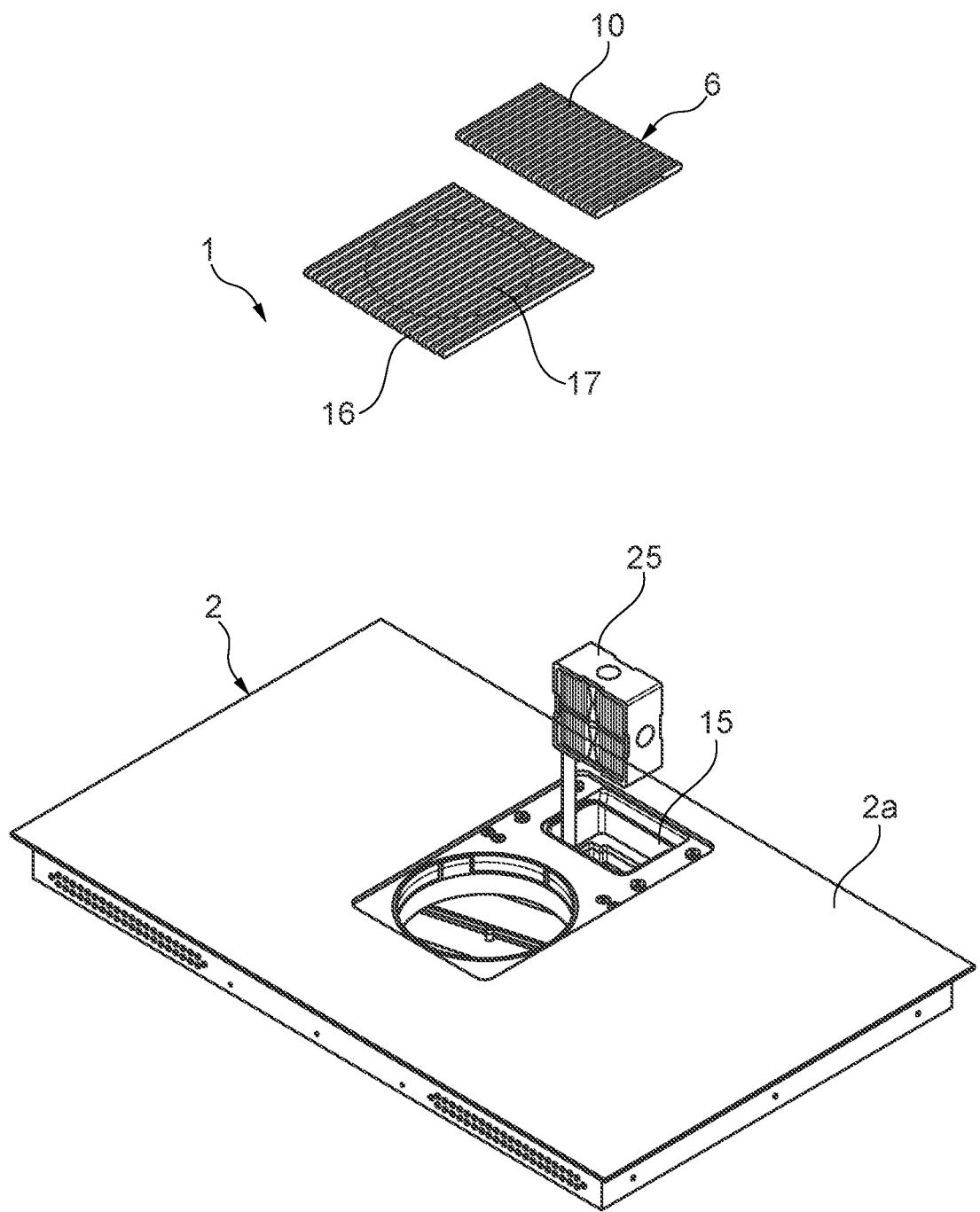
FIG. 4 is a perspective view of a second embodiment of a cooktop of the present invention.
Figure 5:
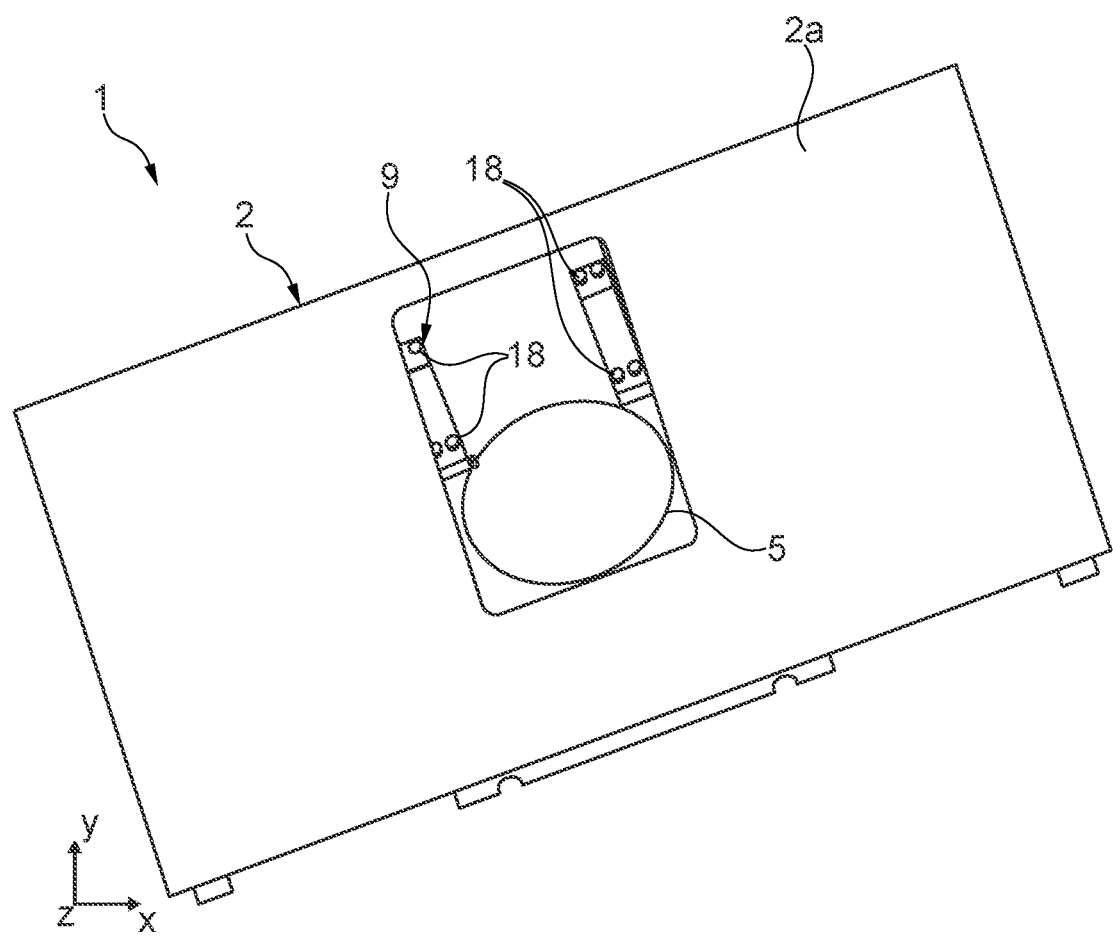
FIG. 5 is a perspective view of the cooktop of FIG. 4, with certain parts omitted to better show other parts.

In a second embodiment, as shown in FIG. 4, the panel 10 is only placed on the housing 15. Here, the cooktop 1 comprises an additional panel 16 that closes the opening 5. Such additional panel 16 is known in the art and will not be further described herein.

It should be noted that the panel 10 has a top surface 10a and a bottom surface 10b, opposite to the top surface 10a. The top surface 10a is designed to be placed in contact with the objects to be weighed, and is particularly substantially coplanar with the top surface 2a of the main body 2. Advantageously, this facilitates ordinary cleaning of the cooktop 1.

Weight sensing means 9 are placed between the support element 6 and the main body 2, to sense the weight of the objects placed on the support element 6, namely on the panel 10. It shall be noted that, advantageously, the weight sensing means 9 are placed in correspondence of the duct 7 and/or of the housing 15.

The cooktop 1 also comprises a grid 17 for the passage of cooking fumes. In the embodiment of FIG. 1, the grid 17 is formed on the panel 10. In the embodiment of FIG. 4, the grid 17 is placed on the additional panel 16.

More in detail, the weight sensing means 9 comprise at least one load cell 18. In the preferred embodiments of the present invention, the weight sensing means 9 comprise a plurality of load cells 18. In alternative embodiments of the present invention, not shown, the weight sensing means 9 may comprise a single load cell.

The load cells 18 are inserted in the main body 2 and are disposed between the main body 2 itself and the panel 10.

Namely, the load cells 18 are arranged along a perimeter of the panel 10. It shall be noted that the load cells 18 are of a type that is known to the skilled person, and will not be further described herein.

In the embodiments of FIGS. 1 and 4, the weight sensing means 9 comprise four load cells 18, each placed at a respective corner of the panel 10.

Figure 6:
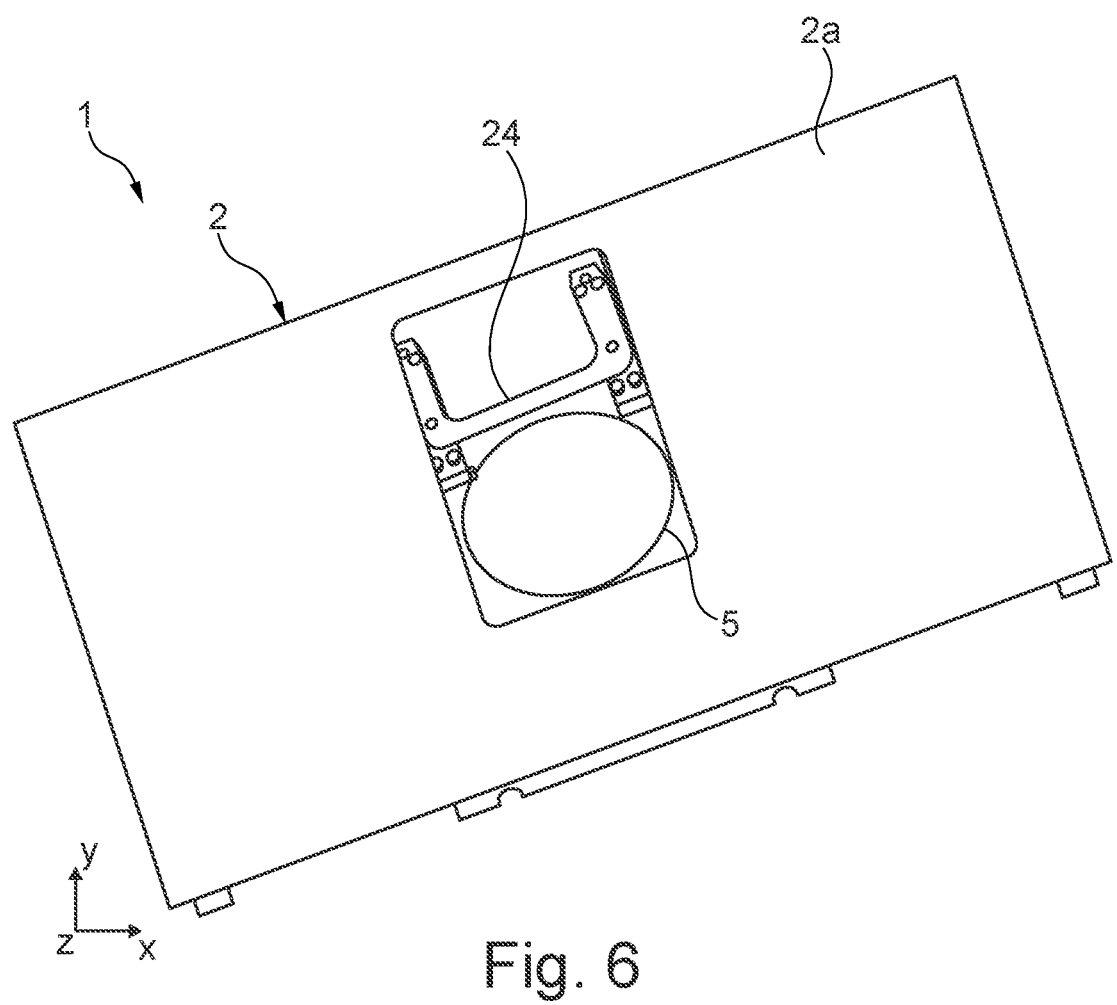
FIG. 6 is a perspective view of a third embodiment of a cooktop of the present invention, with certain parts omitted to better show other parts.

In the embodiment of FIG. 6, the weight sensing means 9 comprise two load cells 18 only. Here, the load cells 18 are arranged at about half the side of the panel 10.

In addition, the weight sensing means 9 comprise a connecting element 24 that joins the load cells 18 with each other. This connecting element 24 is interposed between the load cells 18 and the panel 10.

It will be appreciated from the accompanying figures that any object placed upon the panel 10 will apply a stress to all the load cells 18 beneath the panel 10. It shall be noted that the load cells 18 are electrically connected to one another, such that the weight applied to the panel 10 may be read. Namely, the weight sensing means comprises an electrical connection circuit (not shown), which may be of known type, connecting the load cells 18 to a processing unit (not shown). The electrical connection circuit may be, for example, a Wheatstone bridge.

Preferably, the cooktop 1 comprises display means (not shown), which are connected to the electrical connection circuit and the processing unit, and are able to provide a reading of the sensed weight to the user. For example, these display means may comprise a display incorporated in the main body 2.

Figure 3:
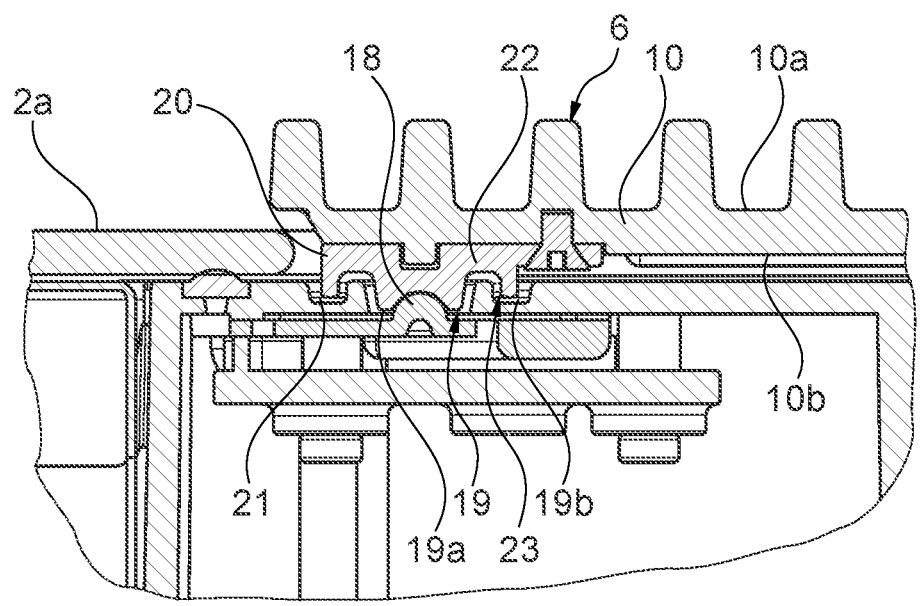
FIG. 3 is a lateral sectional view of a detail of the cooktop of FIGS. 1 and 2.

Particularly referring to FIG. 3, it will be appreciated that the panel 10 comprises a plurality of support zones 19. Each support zone 19 is located at a respective load cell 18. In detail, each support zone 19 preferably has a circular shape as viewed in a plan view, and comprises a central portion 19a which contacts its respective load cell 18. Furthermore, the support zone 19 has a peripheral portion 19b surrounding the central portion 19a.

It shall be noted that each support zone 19 has a respective projection 20. This projection 20 is located at the peripheral portion 19b. The projection 20 juts out of the panel 10, and is transverse, and particularly perpendicular to the panel 10.

As shown in FIG. 3, the main body 2 has a plurality of receptacles 21. Each receptacle 21 is located at a respective load cell 18 and surrounds the load cell 18. Each receptacle 21 is configured to receive a respective projection 20 of the corresponding support zone 19. Advantageously, the receptacle 21 and the projection 20 define a labyrinth seal 23 that surrounds the load cell 18, and limit liquid infiltrations toward the load cell 18.

In the embodiment shown in FIG. 3, the cooktop 1 comprises a plurality of interface elements 22. These interface elements 22 are attached to the panel 10, and particularly to the bottom surface 10b. Note that the support zones 19 are each defined on a respective interface element 22. It should be noted that the interface elements 22 are formed with a material having a limited deformability, such that the weight reading of the load cell 18 will not be altered. Advantageously, the use of interface elements 22 separate from the panel 10 allows the profile of the support zone 19 to fit the particular load cell 18 that is designed to be used without making changes to the panel 10.

According to an alternative embodiment of the invention, not shown, the support zones 19 are formed directly on the panel 10, particularly at the bottom surface 10b. Advantageously, this simplifies the manufacturing process to obtain the panel 10, as the panel 10 can be molded with the shape of the support zones 19 without requiring the attachment of any additional element.

Those skilled in the art will obviously appreciate that a number of changes and variants may be made to the arrangements as described hereinbefore to meet incidental and specific needs. All of these variants and changes fall within scope of the invention, as defined in the following claims.

The invention claimed is:

1. A cooktop, comprising:
a main body having a top surface, a bottom surface, and a suction opening;
at least one cooking area configured to accommodate a heating element proximate to the top surface;
suction means in fluid communication with the suction opening and configured to draw in cooking fumes;
a support element connected to the main body; and
weight sensing means between the support element and the main body for sensing a weight of objects to be weighed;
wherein the support element at least partially overlaps the suction means,
wherein the suction means comprises:
a suction duct in fluid communication with the suction opening; and
a housing in fluid communication with the suction duct and configured to receive filters for the cooking fumes;
wherein the weight sensing means is at the suction duct and/or the housing,
wherein the suction opening is on the top surface and the suction opening is coplanar with the housing,
wherein the support element is superimposed to the suction opening and to the housing,
wherein the weight sensing means comprises at least one load cell,
wherein the support element comprises a panel,
wherein the at least one load cell is along a perimeter of the panel,
wherein the panel has a plurality of support areas, each support area at a respective load cell,
wherein each support area comprises a central portion that contacts its respective load cell and a peripheral portion surrounding the central portion, and
wherein each support ea has a respective protrusion projecting out of the panel at the peripheral portion.

2. The cooktop of claim 1, further comprising:
a grate on the panel for passage of the cooking fumes.

3. The cooktop of claim 1, wherein the panel has a top surface that is substantially coplanar with the top surface of the main body.

4. The cooktop of claim 1, further comprising:
a plurality of interface elements attached to the panel;
wherein each support area is defined on a respective interface element.

5. The cooktop of claim 1, wherein the support areas are directly formed on the panel.

6. The cooktop of claim 1, wherein the weight sensing means comprises a plurality of load cells.

7. The cooktop of claim 1, wherein the weight sensing means comprises two load cells.

8. The cooktop of claim 1, wherein the weight sensing means comprises four load cells.

9. The cooktop of claim 7, further comprising:
a connecting element between the load cells and the panel;
wherein the connecting element joins the load cells with each other.

10. The cooktop of claim 8, further comprising:
a connecting element between the load cells and the panel;
wherein the connecting element joins the load cells with each other.

11. A cooktop, comprising:
a main body having a top surface, a bottom surface, and a suction opening;
at least one cooking area configured to accommodate a heating element proximate to the top surface;
suction means in fluid communication with the suction opening and configured to draw in cooking fumes;
a support element connected to the main body; and
weight sensing means between the support element and the main body for sensing a weight of objects to be weighed;
wherein the support element at least partially overlaps the suction means,
wherein the suction means comprises:
a suction duct in fluid communication with the suction opening; and
a housing in fluid communication with the suction duct and configured to receive filters for the cooking fumes;
wherein the weight sensing means is at the suction duct and/or the housing,
wherein the suction opening is on the top surface and the suction opening is coplanar with the housing, wherein the support element is superimposed to the suction opening and to the housing, wherein the weight sensing means comprises at least one load cell, wherein the support element comprises a panel, wherein the at least one load cell is along a perimeter of the panel, wherein the panel has a plurality of support areas, each support area at a respective load cell, wherein the main body has a plurality of receptacles, each receptacle at a respective load cell and surrounding the respective load cell, and wherein each receptacle is configured to receive a respective protrusion of a respective support area to define a labyrinth seal surrounding the respective load cell.

12. The cooktop of claim 11, further comprising:
a grate on the panel for passage of the cooking fumes.

13. The cooktop of claim 11, wherein the panel has a top surface that is substantially coplanar with the top surface of the main body.

14. The cooktop of claim 11, further comprising:
a plurality of interface elements attached to the panel; wherein each support area is defined on a respective interface element.

15. The cooktop of claim 11, wherein the support areas are directly formed on the panel.

16. The cooktop of claim 11, wherein the weight sensing means comprises a plurality of load cells.

17. The cooktop of claim 11, wherein the weight sensing means comprises two load cells.

18. The cooktop of claim 11, wherein the weight sensing means comprises fog load cells.

19. The cooktop of claim 17, further comprising:
a connecting element between the load cells and the panel;
wherein the connecting element joins the load cells with each other.

20. The cooktop of claim 18, further comprising:
a connecting element between the load cells and the panel;
wherein the connecting element joins the load cells with each other.

* * * * *